United States Patent [19]
Wang

[11] 4,111,828
[45] Sep. 5, 1978

[54] STORAGE STABLE POLYOL MIXTURE

[75] Inventor: Donald S. T. Wang, St. Louis, Mo.

[73] Assignee: Monsanto Company, St. Louis, Mo.

[21] Appl. No.: 756,314

[22] Filed: Jan. 3, 1977

[51] Int. Cl.$^2$ .................. C08G 18/18; C08K 5/52; C08G 18/32

[52] U.S. Cl. .................. 252/182; 521/108; 521/118; 521/175; 521/107

[58] Field of Search .................. 252/182; 260/2.5 AS, 260/2.5 AC, 2.5 AM, 2.5 AJ, 2.5 FP, 77.5 AS, 77.5 AC

[56] References Cited

U.S. PATENT DOCUMENTS

| | | | |
|---|---|---|---|
| 3,073,788 | 1/1963 | Hostettler et al. | 260/2.5 AS |
| 3,846,348 | 11/1974 | Horst et al. | 260/2.5 AS |
| 3,901,959 | 8/1975 | Allport | 260/2.5 AM |
| 3,943,075 | 3/1976 | Fishbein et al. | 260/2.5 AM |
| 4,003,861 | 1/1977 | Savides et al. | 260/2.5 AS |

*Primary Examiner*—Benjamin R. Padgett
*Assistant Examiner*—Irwin Gluck
*Attorney, Agent, or Firm*—George R. Beck; Robert E. Wexler; Edward P. Grattan

[57] ABSTRACT

Stable mixtures, comprising a sucrose-based polyol, a β-haloalkyl phosphate or β-haloalkyl phosphonate flame retardant and a hydroxylamine catalyst are provided which are characterized by prolonged shelf life. The stable mixtures are used in the preparation of foamed urethane polymers by reaction thereof with an isocyanate. The urethane polymers are useful as flexible foam insulating material in buildings, pipe lines, storage tanks and refrigerators and as flexible foams in cushions, mattresses, carpet backings, and packaging materials.

13 Claims, No Drawings

STORAGE STABLE POLYOL MIXTURE

BACKGROUND OF THE INVENTION

The uses of urethane polymer foams, whether flexible or rigid, are well known. They are used, for example, in furniture, transportation, bedding, textile laminates, carpet backing, packaging, insulation and flotation materials. Polyurethanes are made by the reaction of an isocyanate with a polyol. Ordinarily, the manufacturer of the urethane foam buys the reactive components in separate packages. One reactive component, commonly called the "A-side" component, contains the isocyanate. The other component, commonly called the "B-side" component, contains polyol, catalyst and other ingredients, e.g., surfactant, foaming agent, fire retardant and the like. The fire retardant may be admixed with either the A-side or B-side component, but if the fire retardant is capable of reacting with the isocyanate the fire retardant must be admixed with the B-side.

Unfortunately, a problem occurs in the incorporating a fire retardant, such as a phosphorus- or halogen-containing fire retardant, in the B-side component. The normal hydrolytic instability of such fire retardants leads to an increase in acidity in the mixture with a consequent increase in ionizable chlorine. The increased chlorine ion concentration deactivates the normally used tertiary amine catalysts and, thus, changes the characteristics of the foaming mechanism. Deactivation of the catalyst is due to reaction between the tertiary amine and the halogen- or phosphorus-containing fire retardant to form a quaternary ammonium salt. These deleterious effects do not occur immediately, but over a period of time. This results in a storage stability problem, i.e., prolonged storage of the B-side component, and concomitant deactivation of the catalyst followed by addition of the B-side component to the A-side component, yields a poor urethane polymer.

Accordingly, the present invention is directed to a B-side urethane polymer component, containing fire retardant, which is characterized by prolonged storage life.

PRIOR ART

Applicants are aware of no pertinent prior art applicable to the present invention.

SUMMARY OF THE INVENTION

In accordance with the present invention, there is provided a storage stable B-side urethane polymer component which comprises utilizing a hydroxylamine catalyst in place of the normally utilized tertiary amine catalyst. Thus, the present invention is directed to a composition comprising a sucrose-based polyol, $\beta$-haloalkyl phosphate or $\beta$-haloalkyl phosphonate fire retardant and a hydroxylamine catalyst.

SPECIFIC EMBODIMENTS OF THE INVENTION

In accordance with the present invention, it has been found that replacement of the tertiary amine catalyst in the B-side urethane polymer component with a hydroxylamine catalyst effects prolonged storage stability of the B-side component. Apparently, the hydroxyl group of the hydroxylamine catalyst partially stabilizes the activity of the tertiary amine, thus affording a storage stable B-side component, i.e. a B-side component in which the amine catalyst is not deactivated by the fire retardant.

Sucrose-based polyols are conventionally prepared by reacting sucrose with alkylene oxides. Those which are useful in accordance with the present invention include MULTRANOL ® 4034 and 4030, VORANOL ® RS-530, RS-450, RS-410 as well as PLURACOL ® 669 and 240. The typical structure of these compounds may be represented as shown below:

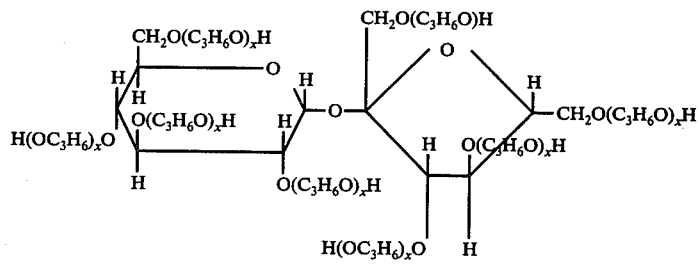

Isocyanates which are used in the preparation of urethane polymers include polyisocyanates such as toluene diisocyanate and polymeric isocyanates such as MONDUR ® MR or MRS or PAPI 135, PAPI 901. The polyaryl isocyanates are preferred and have the general chemical structure:

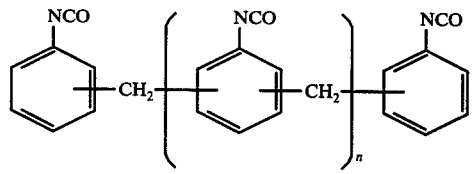

The fire retardants which are useful in accordance with the present invention, are $\beta$-haloalkyl phosphates or $\beta$-haloalkyl phosphonates, such as tris(2,3-dibromopropyl) phosphate, tris($\beta$-chloroethyl) phosphate, tris(1,3-dichloroisopropyl) phosphate, tris(2,3-dichloropropyl) phosphate, tris ($\beta$-chloropropyl) phosphate, PHOSGARD ® C-22R, i.e., $\beta$-chloroethyl polyphosphonate of the formula

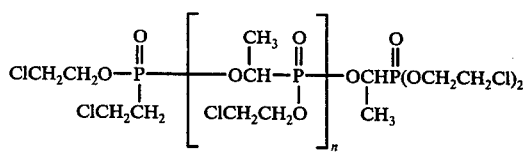

wherein $n$ has an average value of 1 to 2, PHOSGARD ® 2XC20, i.e. 2,2-bis(chloromethyl) trimethylene bis[bis(2-chloroethyl) phosphate] and diethylene glycol-bis-di-2-chloroethyl phosphate.

In place of the normally used tertiary amine catalysts, which facilitate the normal reaction between the polyol and the isocyanate, the present invention contemplates the use of hydroxylamine catalysts, including dimethylamino-2-propanol, methyl-di-ethanolamine, a mixture of o- and p-dimethylaminomethyl phenols and triethanolamine.

Ordinarily, one would not use hydroxylamine catalysts, since they are of a low order of reactivity, i.e., inefficient. Their use requires much higher levels of catalysts than are ordinarily used. Accordingly, whereas a tertiary amine catalyst is normally used in a concentration of about 2.0 to about 5.5 phr (parts per hundred parts resin), the hydroxylamine catalyst is used in a range of from about 6 to about 22 phr, preferably from about 9 to about 15 phr.

Generally, the preparation of a foamed urethane polymer involves mixing the A-component and B-component (fresh or aged) together and pouring the mixture into a suitable container where it reacts, foams, and cures. The cream and rise times are determined visually.

EXAMPLE

This example illustrates the comparable foaming characteristics of polyurethanes having B-side components containing a tertiary amine vs. a hydroxylamine catalyst.

A polyurethane foam was formulated and tested as indicated below.

| Ingredients | Control | Sample No. 1 | 2 | 3 |
|---|---|---|---|---|
| | | Wt. (gms) | | |
| A-side | | | | |
| Polymethylene polyphenyl isocyanate | 139 | 139 | 168 | 148 |
| B-side | | | | |
| Sucrose-based polyol[1] | 100 | 100 | 100 | 100 |
| Water | 1.0 | 1.0 | 1.0 | 1.0 |
| Silicone/glycol copolymer[2] | 1.6 | 1.6 | 1.6 | 1.6 |
| Trichloromonofluoromethane[3] | 30 | 30 | 30 | 30 |
| Catalyst #1[4] | 2 | 2 | | |
| Catalyst #2[5] | | | 14 | |
| Catalyst #3[6] | | | | 8 |
| Flame Retardant[7] | | 10 | 10 | 10 |

[1]MULTRANOL ® 4034, Mobay Chemical Company
[2]DC 193 Surfactant, Dow Corning
[3]Blowing Agent (NIAX ® 11) Union Carbide
[4]N,N,N',N'-tetramethyl-1,3-butanediamine
[5]Methyl-di-ethanolamine
[6]Dimethylamino-2-propanol
[7]PHOSGARD ® C-22-R, Monsanto Company Samples 2 and 3 contain a greater amount of the less efficient hydroxylamine catalyst, but as can be seen from the "As Prepared" cream and rise times, the amounts of catalyst in Samples 1–3 are equivalent in catalytic activity.

| | Control | Sample No. 1 | 2 | 3 |
|---|---|---|---|---|
| As Prepared: | | | | |
| Cream time (sec) | 25 | 25 | 20 | 18 |
| Rise time (sec) | 175 | 180 | 214 | 183 |
| Aged (23° C., One Month): | | | | |
| Cream time (sec) | 25 | 120 | 26 | 26 |
| Rise time (sec) | 141 | 800 | 320 | 245 |

The data show that

1. The B-component of the control foam is reasonably stable, since there is no β-halophosphate esters involved.

2. From Sample No. 1, while the β-halophosphate ester is included, the deleterious effect occurs because of the strength of the traditional amine catalyst being deactivated by the additive.

3. No serious deterioration appears in the B-components of Samples No. 2 and No. 3, which use the hydroxylamine catalyst.

Essentially similar results are afforded when other hydroxylamine catalysts and other β-halophosphate flame retardants, such as PHOSGARD ® 2XC20, PHOSGARD ® 1227, tris(2,3-di-bromopropyl) phosphate, tris(β-chloroethyl) phosphate, tris(1,3-dichloroisopropyl) phosphate, tris(2,3-dichloropropyl) phosphate, tris(β-chloropropyl) phosphate, are used.

While the invention has been described hereinabove with regard to certain illustrative, specific embodiments, it is not so limited since many modifications and variations are possible in the light of the above teachings. It is understood, therefore, that the invention may be practiced otherwise than as specifically described without departing from the spirit and scope of the invention.

The embodiments of the invention in which an exclusive property or privilege is claimed are defined as follows:

1. In a B-side mixture used to prepare a flame retarded urethane polymer foam, said mixture comprising a sucrose-based polyol prepared by reacting sucrose with alkylene oxide, a β-halophosphonate and a catalyst, the improvement which comprises using as said catalyst a hydroxylamine selected from dimethylamino-2-propanol, methyl-di-ethanolamine, triethanolamine and a mixture of o- and p-dimethylaminomethyl phenols.

2. Mixture of claim 1 wherein said β-halophosphonate is a compound of the formula

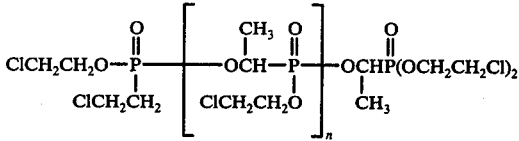

wherein n is an average value of about 1 to about 2.

3. Mixture of claim 2 wherein said hydroxylamine is dimethylamino-2-propanol.

4. Mixture of claim 2 wherein said hydroxylamine is methyl-di-ethanolamine.

5. Mixture of claim 2 wherein said hydroxylamine is a mixture of o- and p-dimethylaminomethyl phenols.

6. Mixture of claim 2 wherein said hydroxylamine is triethanolamine.

7. In a B-side mixture used to prepare a flame retarded urethane polymer foam, said mixture comprising a sucrose-based polyol prepared by reacting sucrose with alkylene oxide, a β-halophosphate and a catalyst, the improvement which comprises using as said catalyst a hydroxylamine selected from dimethylamino-2-propanol, methyl-di-ethanolamine, triethanolamine and a mixture of o- and p-dimethylaminomethyl phenols.

8. Mixture of claim 7 wherein said β-halophosphate is 2,2-bis(chloromethyl) trimethylene bis[bis(2-chloroethyl) phosphate].

9. Mixture of claim 7 wherein said β-halophosphate is diethylene glycol-bis-di-2-chloroethyl phosphate.

10. Mixture of claim 7 wherein said β-halophosphate is tris(2,3-dibromopropyl) phosphate.

11. Mixture of claim 7 wherein said β-halophosphate is tris(β-chloroethyl) phosphate.

12. Mixture of claim 7 wherein said hydroxylamine is dimethylamino-2-propanol.

13. Mixture of claim 7 wherein said hydroxylamine is methyl-di-ethanolamine.

* * * * *